United States Patent
Cheng et al.

(10) Patent No.: US 7,869,676 B2
(45) Date of Patent: Jan. 11, 2011

(54) LIQUID CRYSTAL DISPLAY PANEL WITH DUAL-TFTS PIXEL UNITS HAVING DIFFERENT TFT CHANNEL WIDTH/LENGTH RATIOS

(75) Inventors: Yung-Chiang Cheng, Miao-Li (TW); Hsin-Ming Chen, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 323 days.

(21) Appl. No.: 11/595,486

(22) Filed: Nov. 10, 2006

(65) Prior Publication Data
US 2007/0103615 A1    May 10, 2007

(30) Foreign Application Priority Data
Nov. 10, 2005  (CN) .................. 2005 1 0101189

(51) Int. Cl.
*G02F 1/136* (2006.01)
(52) U.S. Cl. ........................................ 385/43
(58) Field of Classification Search .......... 349/42, 349/43
See application file for complete search history.

(56) References Cited

U.S. PATENT DOCUMENTS

| | | | |
|---|---|---|---|
| 6,914,588 B2 | 7/2005 | Tsai et al. | |
| 6,914,644 B2 | 7/2005 | Fukami et al. | |
| 2009/0002591 A1* | 1/2009 | Yamazaki et al. | ............. 349/43 |
| 2009/0009677 A1* | 1/2009 | Yamazaki et al. | ............. 349/43 |

FOREIGN PATENT DOCUMENTS

| | | |
|---|---|---|
| JP | 62-182717 A | 8/1987 |
| WO | 2004090622 A | 10/2004 |

* cited by examiner

*Primary Examiner*—Sarah Song
(74) *Attorney, Agent, or Firm*—Wei Te Chung

(57) ABSTRACT

An exemplary liquid crystal display (200) includes a plurality of gate lines (201), data lines (202), common lines (210), first pixel electrodes (204) and second pixel electrodes (214). Each of areas defined by one of the first pixel electrodes and an adjacent one of the second pixel electrodes is a pixel unit (208). Each pixel unit is driven by a first TFT (203) and a second TFT (213). The first thin film transistor and the second thin film transistor in each pixel unit are connected to a same one of the gate lines and a same one of the data lines, and to the first pixel electrode and the second pixel electrode respectively. A channel width/length ratio of the first thin film transistor is different from a channel width/length ratio of the second thin film transistor.

20 Claims, 6 Drawing Sheets

LIQUID CRYSTAL DISPLAY PANEL WITH DUAL-TFTS PIXEL UNITS HAVING DIFFERENT TFT CHANNEL WIDTH/LENGTH RATIOS

BACKGROUND OF THE INVENTION

1. Field of the Invention

The present invention relates to liquid crystal displays, and in particular to a liquid crystal display panel that includes two thin film transistors in each of pixel units thereof, the two thin film transistors having different Channel width/length ratios.

2. General Background

Liquid crystal displays (LCDs) generally have the advantages of lightness in weight, a thin profile, flexible sizing, and low power consumption. For these reasons, LCDs are widely used in products such as laptops, personal digital assistants, mobile phones, and so on. An LCD typically includes an LCD panel. The LCD panel is generally formed by an upper substrate, a lower substrate, and a liquid crystal layer interposed between the substrates.

A conventional LCD such as a twisted nematic (TN) LCD commonly has a rather limited viewing angle. Thus, a technique known as Multi-domain Vertical Alignment (MVA) has been developed. In an MVA-type LCD, each of pixel units of an LCD panel of the LCD is divided into at least two regions (domains) with a plurality of protrusions formed on both of the upper and lower substrates thereat. Liquid crystal molecules of the liquid crystal layer within each region have different pre-tilt angles according to the configurations of the protrusions. The result is that the viewing angle of the LCD is broadened. A means for driving the LCD includes using two thin film transistors (TFTs) in each pixel unit for respectively driving the two different regions of the pixel unit.

Referring to FIGS. 4 and 5, aspects of a conventional MVA-type LCD panel are illustrated. The LCD panel 100 includes a plurality of gate lines 101, first data lines 102, and second data lines 112. The first and second data lines 102, 112 are parallel to each other and arranged in alternating fashion. The first and second data lines 102, 112 are insulated from and cross the gate lines 101. Each of pixel units 108 is divided into an upper pixel area and a lower pixel area by a corresponding one of the gate lines 101 crossing through a middle portion of the pixel unit 108.

The upper pixel area includes a first thin film transistor (TFT) 103, a first pixel electrode 104, and a common electrode 105. The first TFT 103 includes a gate 1031, a source 1032, and a drain 1033. The gate 1031 connects to the gate line 101, the source 1032 connects to the first data line 102, and the drain 1033 connects to the first pixel electrode 104. The first pixel electrode 104 and the common electrode 105 define a first liquid crystal (LC) capacitor (not labeled) for controlling a tilt angle of liquid crystal molecules in a liquid crystal layer of the upper pixel area.

The lower pixel area includes a second TFT 113, a second pixel electrode 114, and the common electrode 105. The second TFT 113 includes a gate 1131, a source 1132, and a drain 1133. The gate 1131 connects to the gate line 101, the source 1132 connects to the second data line 112, and the drain 1133 connects to the second pixel electrode 114. Thus the gates 1031, 1131 of the first and second TFTs 103, 113 are connected to the same gate line 101 within the pixel unit 108. The second pixel electrode 114 and the common electrode 105 define a second LC capacitor (not labeled) for controlling a tilt angle of liquid crystal molecules in the liquid crystal layer of the lower pixel area.

FIGS. 6A and 6B show tilt angles of liquid crystal molecules in each of the upper and lower pixel areas respectively. Referring also to FIGS. 4 and 5, operation of the LCD panel 100 is as follows. Firstly, the gates 1031, 1131 of the first and second TFTs 103, 113 are enabled by the gate line 101. Thereby, the sources 1032, 1132 are connected to the drains 1033, 1133 respectively. Secondly, the first pixel electrode 104 is charged via a first signal transferred through the first data line 102, and the second pixel electrode 114 is charged via a second signal transferred through the second data line 112. Thirdly, tilt angles $\theta_1$ and $\theta_2$ of the liquid crystal molecules arranged in the upper and lower pixel areas respectively are determined by the electrical potentials of the first and second pixel electrodes 104, 114 respectively. The electrical potentials of the first and second pixel electrodes 104, 114 are different from each other. Therefore, the pixel unit 108 having two different tilt angles in the upper and lower pixel areas thereof respectively can be realized.

The LCD panel 100 needs to provide the two data lines 102, 112 for each of columns of the pixel units 108 arranged in the matrix of pixel units 108. Typically, the data lines 102, 112 are made of opaque material such as metallic material. Therefore the aperture ratio of the LCD panel 100 is rather low.

Accordingly, what is needed is an LCD configured to provide both MVA and a high aperture ratio.

SUMMARY

Embodiments of the invention provide an LCD panel with improved high aperture ratio and lower color shift.

One embodiment of the invention provides an LCD panel including a plurality of gate lines, data lines, first pixel electrodes, and second pixel electrodes. Each of areas defined by one of the first pixel electrodes and an adjacent one of the second pixel electrodes is a pixel unit. Each pixel unit is driven by a first TFT and a second TFT. The first TFT and the second TFT in each pixel unit are connected to a same one of the gate lines and a same one of the data lines, and to the first pixel electrode and the second pixel electrode respectively. A channel width/length ratio of the first TFT is different from a channel width/length ratio of the second TFT.

Gate electrodes of the first TFT and the second TFT are both connected to the same gate line, and source electrodes of the first TFT and the second TFT are both connected to the same data line. The channel width/length ratio of the first TFT is 1.5~2.5 times larger than the channel width/length ratio of the second TFT, or approximately 2 times larger is experimental preferred. The LCD additionally has a common electrode, forming a plurality of LC capacitors between the common electrode and the first pixel electrodes or the second pixel electrodes, and a plurality of common lines, forming a plurality of storage capacitors with the first pixel electrodes or the second pixel electrodes and electrically connected to the first capacitors in parallel connection Another embodiment of the invention provides another approach. An LCD panel has a first transparent substrate, a second transparent substrate, and a liquid crystal layer sealed between the first transparent substrate and the second transparent substrate. A first transparent substrate includes a plurality of gate lines, common lines, and a plurality of data lines crossing the gate lines and common lines at the first transparent substrate. A plurality of pixel units are defined by areas each surrounded by two respective adjacent common lines and two respective adjacent data lines, and each pixel unit has a first pixel electrode, a second pixel electrode, a first TFT associated with the first pixel electrode, and a second TFT associated with the second pixel electrode. The first TFT and the second TFT are respectively connected to a same gate line, a same data line, and the corresponding first pixel electrode or second pixel electrode. A channel width/length ratio of each of the first TFT and second TFT are different from each other.

Gate electrodes of each first TFT and corresponding second TFT in the same pixel unit are both connected to one of the adjacent gate lines. Source electrodes of each first TFT and corresponding second TFT in the pixel unit are both connected to one of the adjacent data lines. The channel width/length ratio of the first TFT is 1.5~2.5 times larger than the channel width/length ratio of the second TFT, or 2 times larger is experimentally preferred. The LCD additionally has a common electrode disposed at the second transparent substrate, wherein in each pixel unit, a first liquid crystal (LC) capacitor is formed between the common electrode and the first pixel electrode, and a second LC capacitor is formed between the common electrode and the second pixel electrode, and a plurality of common lines, forming a plurality of storage capacitors with the first pixel electrodes or the second pixel electrodes and electrically connected to the first capacitors in parallel connection A detailed description of various embodiments is given below with reference to the accompanying drawings.

DETAILED DESCRIPTION

Figure 1:
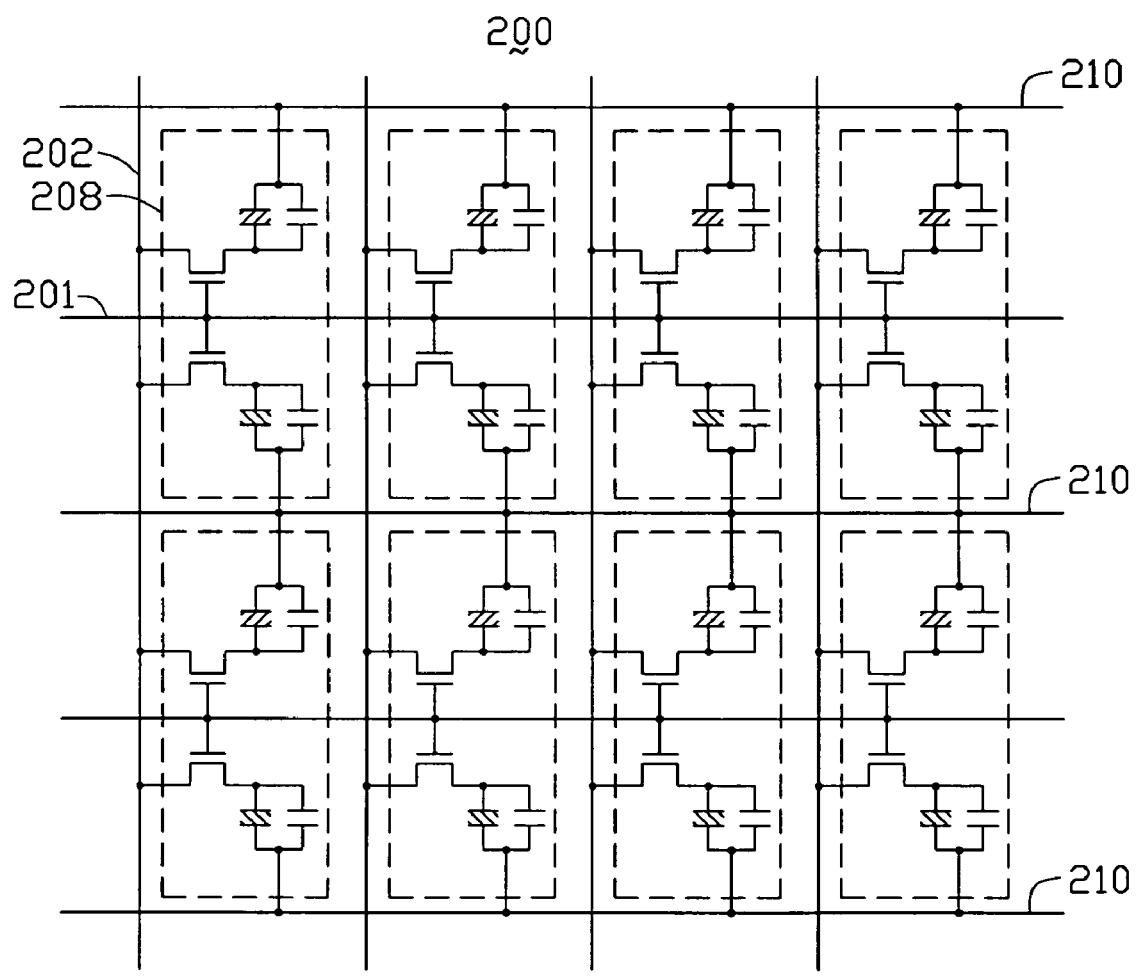
FIG. 1 is a schematic plan view of a portion of an LCD panel of an exemplary embodiment of the present invention, but only showing certain components thereof.

FIG. 1 shows part of an LCD panel of an exemplary embodiment of the present invention. The LCD panel 200 has a liquid crystal layer (not shown) interposed between two transparent substrates (not shown), and a control circuit in a matrix form (partly shown) to control orientations of liquid crystal molecules in the liquid crystal layer and thereby modulate the polarization of light passing through the LCD panel 200. Detailedly, the LCD panel 200 includes a plurality of gate lines 201, a plurality of data lines 202, a plurality of common lines 210, and a plurality of pixel units 208. The gate lines 201 and common lines 210 are arranged in parallel on a first one of the substrates, and the data lines 202 are arranged on the first substrate transversely to the gate lines 201 and common lines 210. That is, the gate lines 201, common lines 210, and data lines 202 form a matrix that constitutes a part of the control circuit. The matrix includes a plurality of pixel units 208, each of which is defined by an area surrounded by two adjacent common lines 210 and two adjacent data lines 202.

Figure 2:
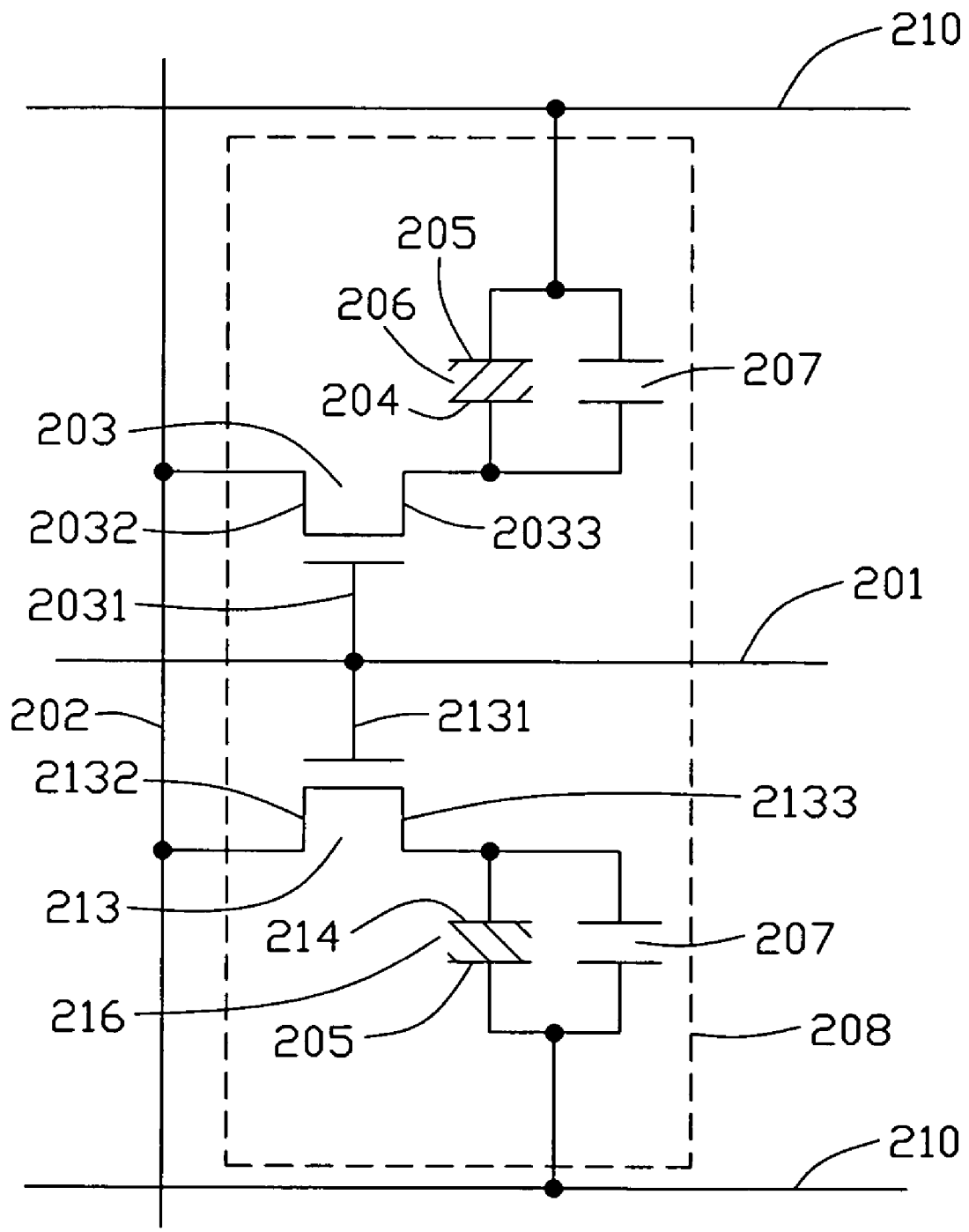
FIG. 2 is an equivalent circuit diagram of one of pixel units of the LCD panel of FIG. 1.

FIG. 2 is an equivalent circuit diagram of any one pixel unit 208 of the LCD panel 200. The pixel unit 208 is divided into an upper pixel area and a lower pixel area by a corresponding one of the gate lines 201. A first pixel electrode 204 and a first TFT 203 are provided in the upper pixel area, and a second pixel electrode 214 and a second TFT 213 are provided in the lower pixel area. The first TFT 203 and second TFT 213 are disposed adjacent opposite sides of the gate line 201 respectively. However, in alternative embodiments, the first and second TFTs 203, 213 can be disposed elsewhere in the upper and lower pixel areas respectively. A gate electrode 2031 of the first TFT 203 and a gate electrode 2131 of the second TFT 213 are both connected to the same gate line 201. A source electrode 2032 of the first TFT 203 and a source electrode 2132 of the second TFT 213 are both connected to a same data line 202. A drain electrode 2033 of the first TFT 203 and a drain electrode 2133 of the second TFT 213 are respectively connected to the first pixel electrode 204 and the second pixel electrode 214.

A common electrode 205 is provided on a second one of the substrates. The common electrode 205 can be made of metal oxide, such as indium tin oxide (ITO). The first pixel electrode 204 in each pixel unit 208 on the first substrate and the common electrode 205 on the opposite second substrate form a first LC capacitor 206, and the second pixel electrode 214 in each pixel unit 208 on the first substrate and the common electrode 205 on the opposite second substrate form a second LC capacitor 216.

The LCD panel 200 further includes a pair of storage capacitors 207 in each pixel unit 208. The storage capacitors 207 are, for example, constituted by the first and second pixel electrodes 204, 214 and the respective common lines 210. That is, typically, the common lines 210 are insulated from but respectively overlap the pixel electrodes 204, 214 on the first substrate. In an alternative embodiment, the storage capacitors 207 can be constituted by the first and second pixel electrodes 204, 214 and corresponding extension portions of the respective common lines 210. The storage capacitors 207 in the upper and lower pixel areas are respectively connected in parallel to the first LC capacitor 206 and the second LC capacitor 216. The storage capacitors 207 help the first and second LC capacitors 206, 216 to maintain the data voltage applied to the first pixel electrode 204 and the second pixel electrode 214, respectively.

In this embodiment, channel width/length (W/L) ratios of the first TFTs 203 and second TFTs 213 are different. The relationship between the drain current $I_d$ and the channel width/length ratio of each TFT 203, 213 is provided by the following equation:

$$I_d = U_n C_{ox} \frac{W}{L} \left[ (V_{gs} - V_t)V_{ds} - \frac{V_{ds}^2}{2} \right] \quad (1)$$

wherein $U_n$ is the Field Effect Mobility of the TFT 203 or 213, $C_{ox}$ is the Gate Oxide Capacitance, $V_{gs}$ is the voltage difference between a gate terminal and a drain terminal of the TFT 203 or 213, $V_t$ is the threshold voltage of the TFT 203 or 213, $V_{ds}$ is the voltage difference between a source terminal and the drain terminal of the TFT 203 or 213, and (W/L) is the channel width/length ratio of the TFT 203 or 213.

According to the above equation (1), the drain current $I_d$ of the TFT 203 or 213 is proportional to the channel width/length ratio of the TFT 203 or 213 when the other parameters are fixed. Therefore the drain currents $I_d$ of the first and second TFTs 203, 213, which are connected to the same gate line 201 and the same data line 202 in the pixel unit 208, are different when the gate line 201 is provided with an enable signal.

Figure 3:
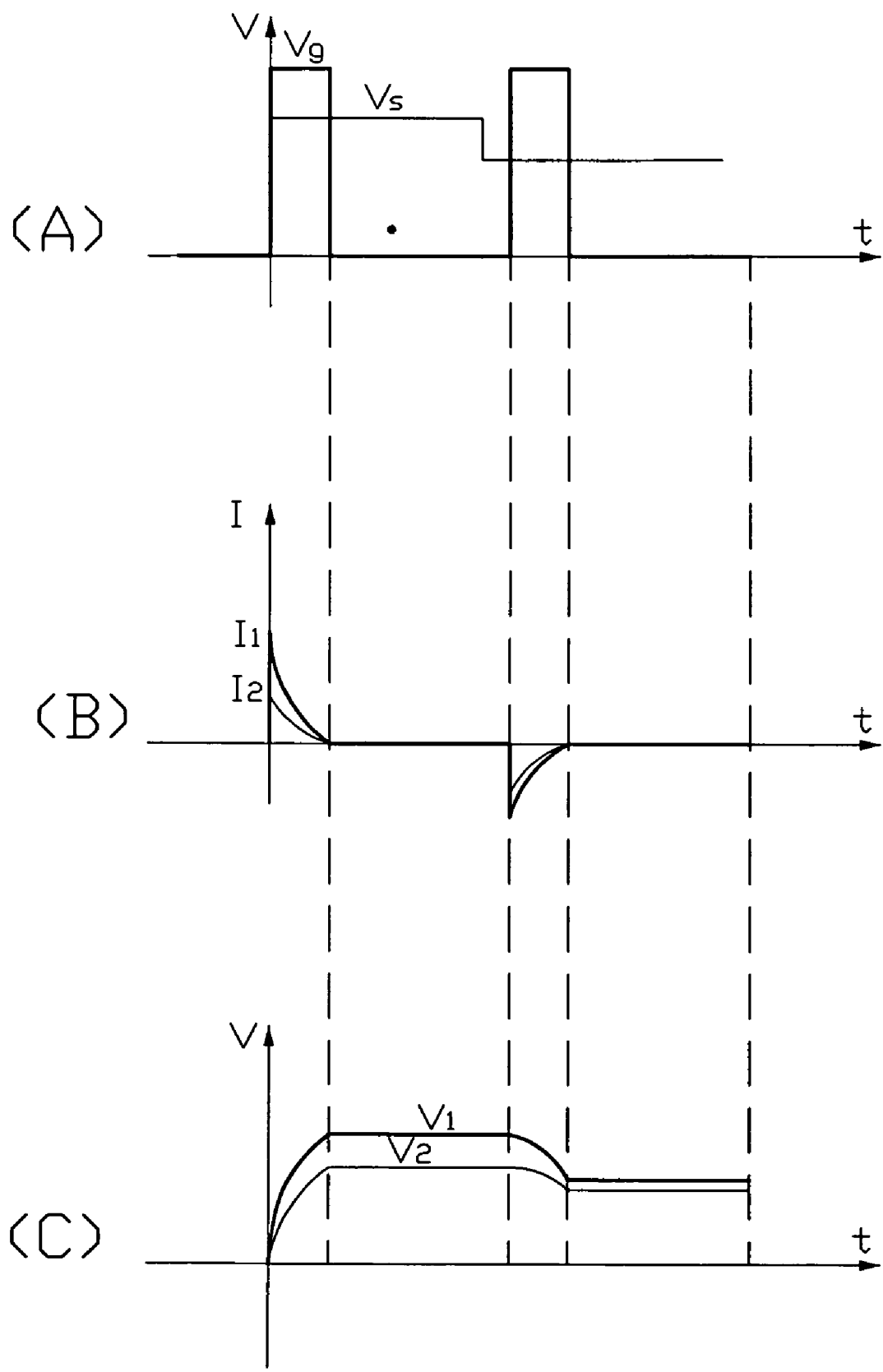
FIG. 3 is a graph showing exemplary driving waveforms for first and second TFTs of the pixel unit of FIG. 2.
Figure 4:
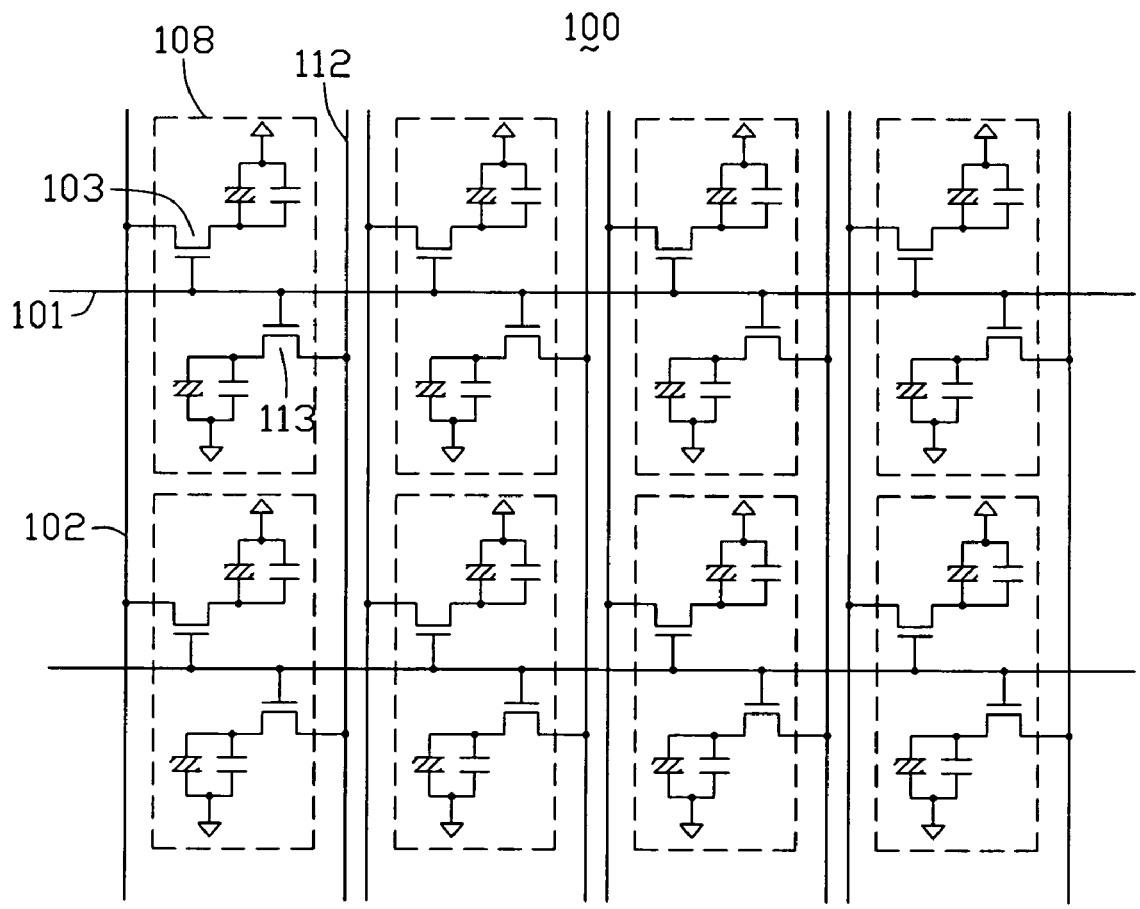
FIG. 4 is a schematic plan view of a portion of a conventional multi-domain LCD panel, but only showing certain components thereof.
Figure 5:
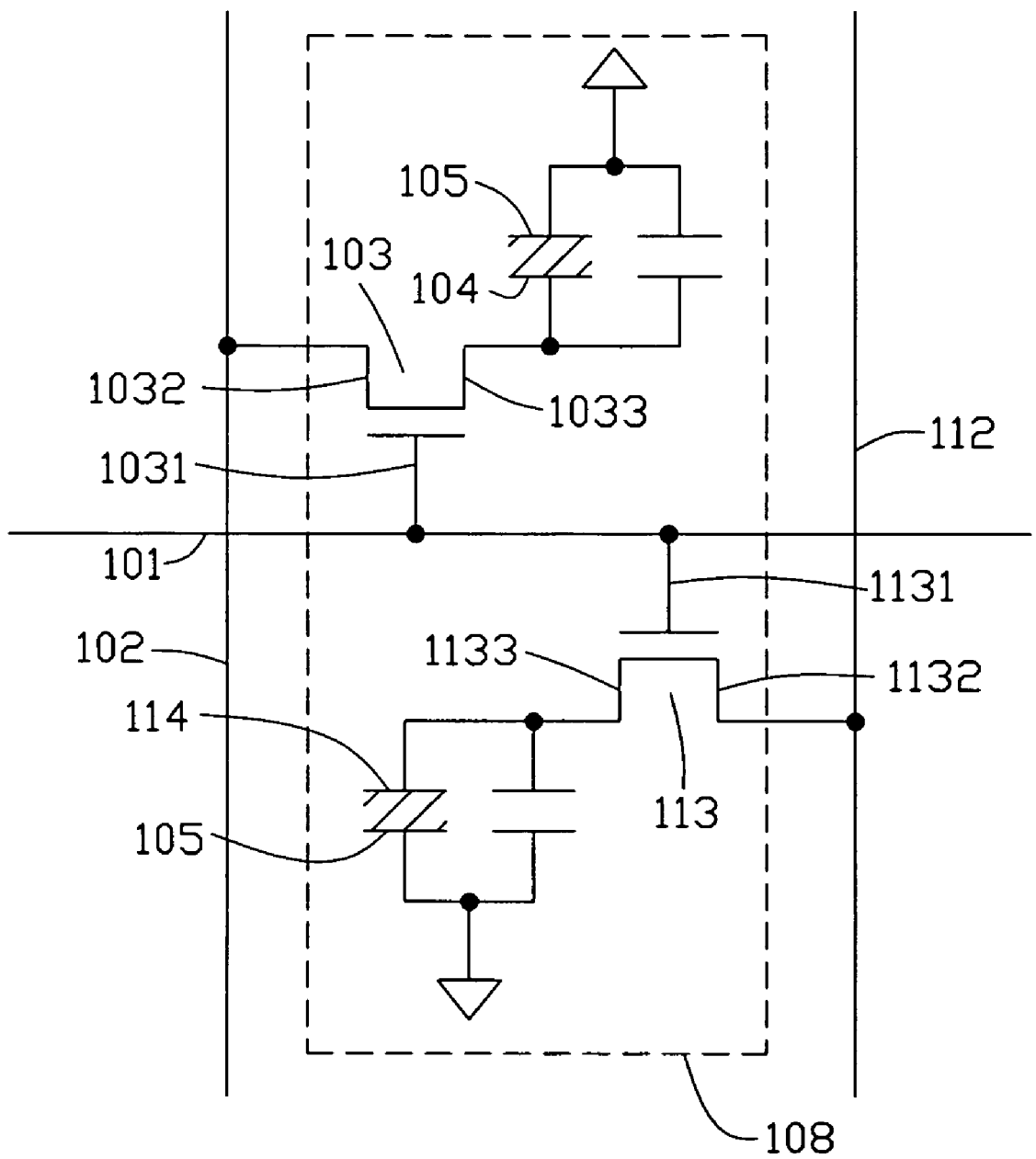
FIG. 5 is an equivalent circuit diagram of one of pixel units of the LCD panel of FIG. 4.
Figure 6A:
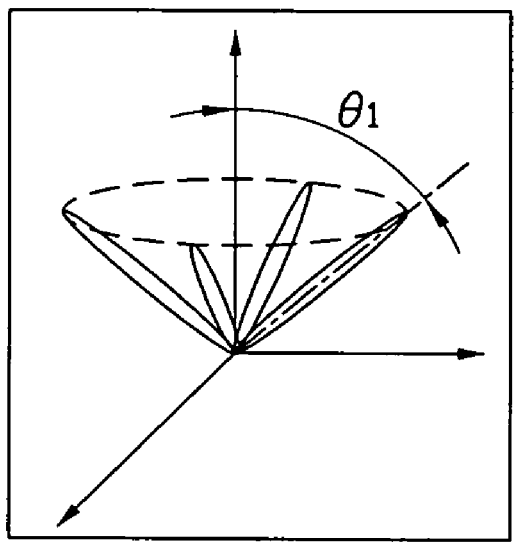
FIGS. 6A and 6B are Cartesian diagrams showing tilt angles of liquid crystal molecules in each of upper and lower pixel areas of the pixel unit of FIG. 5 respectively.
Figure 6B:
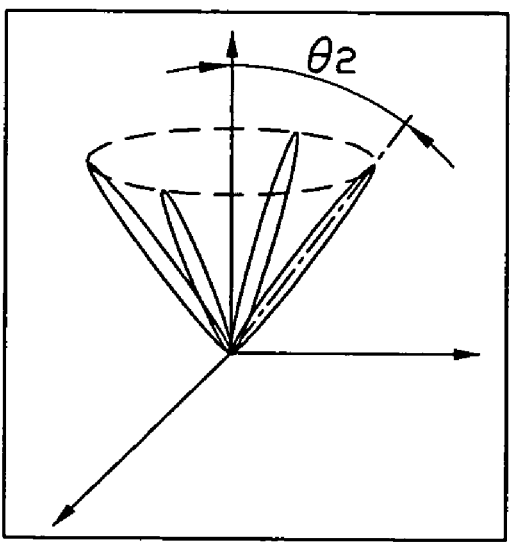

FIG. 3 is a graph showing exemplary driving waveforms for the first and second TFTs 203, 213 of the LCD panel 200. In all the waveforms (A), (B), (C), the horizontal axis 't' represents time. In waveforms (A) and (C), the vertical axis 'V' represents voltage. In waveform (B), the vertical axis 'I' represents current. In waveform (A), a common gate voltage $V_g$ and a common source voltage $V_s$ of the first TFT 203 and the second TFT 213 in the same pixel unit 208 are shown. In waveform (B), a drain current $I_1$ of the first TFT 203 and a drain current $I_2$ of the second TFT 213 in the same pixel unit 208 are shown. In waveform (C), a drain voltage $V_1$ of the first TFT 203 and a drain voltage $V_2$ of the second TFT 213 in the same pixel unit 208 are shown.

Referring to FIGS. 2 and 3, the first TFT 203 and the second TFT 213 of the pixel unit 208 are enabled when a high stage gate voltage $V_g$ is applied. Simultaneously, a predetermined source voltage $V_s$ from the same data line 202 is applied to the source electrodes 2032, 2132 of the first and second TFTs 203, 213, such that the drain currents $I_1$ and $I_2$ occur and are introduced into the first pixel electrode 204 and the second pixel electrode 214. Thereby, the first LC capacitor 206 and the corresponding storage capacitor 207 are charged, and the second LC capacitor 216 and the corresponding storage capacitor 207 are charged. The drain voltages $V_1$, $V_2$ of the first and second TFTs 203, 213 are consequently different, because the drain currents $I_1$ and $I_2$ passing through the drain electrodes 2033, 2133 thereof are different. Thereby, the liquid crystal molecules located in the upper and lower pixel areas corresponding to the first pixel electrode 204 and the second pixel electrode 214 in the pixel unit 208 can be driven into different orientations or tilt angles, such that the one single pixel unit 208 can provide more domains than that of a corresponding pixel unit of a conventional TN LCD.

The channel width/length ratio of the first TFT 203 in this embodiment is 1.5~2.5 times larger than the channel width/length ratio of the second TFT 213. However, in other embodiments, the relationship between the channel width/length ratios (hereinafter referred to as 'proportion of ratios') may be outside the above range. When the proportion of ratios is less than 1.5, the difference between the drain voltages $V_1$ and $V_2$ applied to the first pixel electrode 204 and the second pixel electrode 214 may not be large enough. That is, the orientations of the liquid crystal molecules in the upper and lower pixel areas corresponding to the first pixel electrode 204 and the second pixel electrode 214 may not be substantially different. Therefore the gray scale differences in corresponding images generated by the LCD panel 200 may not be recognized by the human eye. When the proportion of ratios is larger than 2.5, the difference between the drain voltages $V_1$ and $V_2$ applied to the first pixel electrode 204 and the second pixel electrode 214 may be too large. That is, the orientations of the liquid crystal molecules in the upper and lower pixel areas corresponding to the first pixel electrode 204 and the second pixel electrode 214 may be too obviously different. Therefore the gray scale differences in corresponding images generated by the LCD panel 200 may be perceived by the human eye as strange, unnatural, and unacceptable. Accordingly, in this embodiment, the proportion of ratios is preferably approximately 2. The efficacy of this proportion of ratios has been supported by experimentation.

Unlike in the above-described conventional LCD panel 100, the channel width/length ratios of the first TFT 203 and the second TFT 213 of each pixel unit 208 of the LCD panel 200 are different, such that the first pixel electrode 204 and the second pixel electrode 214 of each pixel unit 208 can be driven by the first TFT 203 and the second TFT 213 via a same gate line 201 and a same data line 202. Thus the number of opaque wirings such as the gate lines 201 and the data lines 202 of the LCD panel 200 is reduced. This means color shift of the LCD panel 200 are lower and an aperture ratio of the LCD panel 200 can be greatly improved at the same time.

While the above description has been by way of examples and in terms of preferred embodiments, it is to be understood that the invention is not limited thereto. To the contrary, the above description is intended to cover various modifications and similar arrangements as would be apparent to those skilled in the art. Therefore, the scope of the appended claims should be accorded the broadest interpretation so as to encompass all such modifications and similar arrangements.

We claim:

1. A liquid crystal display panel, comprising:
a plurality of gate lines;
a plurality of data lines intersecting with the gate lines;
a plurality of first pixel electrodes and a plurality of second pixel electrodes, wherein each of areas defined by one of the first pixel electrodes and an adjacent one of the second pixel electrodes is a pixel unit;
a common electrode, wherein a plurality of liquid crystal (LC) capacitors is formed between the common electrode and the first pixel electrodes and between the common electrode and the second pixel electrodes; and
a plurality of first thin film transistors and second thin film transistors, wherein each of the pixel units comprises one of the first thin film transistors and one of the second thin film transistors, the first thin film transistor and the second thin film transistor in each pixel unit are connected to a same one of the gate lines and a same one of the data lines, and to the first pixel electrode and the second pixel electrode respectively, and a channel width/length ratio of the first thin film transistor is different from a channel width/length ratio of the second thin film transistor.

2. The liquid crystal display panel as claimed in claim 1, wherein gate electrodes of the first thin film transistor and the second thin film transistor are both connected to the same gate line.

3. The liquid crystal display panel as claimed in claim 1, wherein source electrodes of the first thin film transistor and the second thin film transistor are both connected to the same data line.

4. The liquid crystal display panel as claimed in claim 1, wherein the channel width/length ratio of the first thin film transistor is in the range from 1.5~2.5 times larger than the channel width/length ratio of the second thin film transistor.

5. The liquid crystal display panel as claimed in claim 4, wherein the channel width/length ratio of the first thin film transistor is approximately 2 times larger than the channel width/length ratio of the second thin film transistor.

6. The liquid crystal display panel as claimed in claim 1, further comprising a plurality of common lines, wherein in each pixel unit, the first pixel electrode and a corresponding one of the common lines forms a first storage capacitor, the second pixel electrode and another corresponding one of the common lines forms a second storage capacitor, the first storage capacitor is connected in parallel with the LC capacitor of the first pixel electrode, and the second storage capacitor is connected in parallel with the LC capacitor of the second pixel electrode.

7. A liquid crystal display panel, comprising:
a first transparent substrate, a second transparent substrate, and a liquid crystal layer interposed between the first transparent substrate and the second transparent substrate;

a plurality of gate lines and common lines provided at the first transparent substrate;

a plurality of data lines crossing the gate lines and common lines at the first transparent substrate; and a plurality of pixel units each surrounded by two respective adjacent common lines and two respective adjacent data lines, each pixel unit comprising a first pixel electrode, a second pixel electrode, a first thin film transistor associated with the first pixel electrode, and a second thin film transistor associated with the second pixel electrode, wherein the first thin film transistor and the second thin film transistor are respectively connected to a same gate line, a same data line, and the corresponding first pixel electrode or second pixel electrode, and a channel width/length ratio of each of the first thin film transistor and second thin film transistor are different from each other.

8. The liquid crystal display panel as claimed in claim 7, wherein gate electrodes of the first thin film transistor and the second thin film transistor are both connected to the same gate line.

9. The liquid crystal display panel as claimed in claim 7, wherein source electrodes of the first thin film transistor and the second thin film transistor are both connected to the same data line.

10. The liquid crystal display panel as claimed in claim 7, wherein the channel width/length ratio of the first thin film transistor is in the range from 1.5~2.5 times larger than the channel width/length ratio of the second thin film transistor.

11. The liquid crystal display panel as claimed in claim 10, wherein the channel width/length ratio of the first thin film transistor is approximately 2 times larger than the channel width/length ratio of the second thin film transistor.

12. The liquid crystal display panel as claimed in claim 7, further comprising a common electrode disposed at the second transparent substrate, wherein in each pixel unit, a first liquid crystal (LC) capacitor is formed between the common electrode and the first pixel electrode, and a second LC capacitor is formed between the common electrode and the second pixel electrode.

13. The liquid crystal display panel as claimed in claim 12, wherein in each pixel unit, the first pixel electrode and a corresponding one of the common lines forms a first storage capacitor, the second pixel electrode and another corresponding one of the common lines forms a second storage capacitor, the first storage capacitor is connected in parallel with the LC capacitor of the first pixel electrode, and the second storage capacitor is connected in parallel with the LC capacitor of the second pixel electrode.

14. A liquid crystal display panel, comprising:

a plurality of gate lines and a plurality of common lines extending respectively along a first direction while alternately arranged with each other along a second direction perpendicular to said first direction;

a plurality of data lines extending along said second direction and intersecting with the gate lines and the common lines; and a plurality of pixel units each surrounded by two respective adjacent common lines and two respective adjacent data lines;

wherein each pixel unit comprises a first pixel electrode, a second pixel electrode, a first thin film transistor associated with the first pixel electrode, and a second thin film transistor associated with the second pixel electrode, the first thin film transistor and the second thin film transistor connected to a same gate line and a same data line, and respectively connected to the corresponding first pixel electrode and the corresponding second pixel electrode, and a channel width/length ratio of each of the first thin film transistor and second thin film transistor being different from each other.

15. The liquid crystal display panel as claimed in claim 14, further comprising a common electrode, wherein in each pixel unit, a first liquid crystal (LC) capacitor is formed between the common electrode and the first pixel electrode, and a second LC capacitor is formed between the common electrode and the second pixel electrode.

16. The liquid crystal display panel as claimed in claim 15, wherein in each pixel unit, the first pixel electrode and a corresponding one of the common lines forms a first storage capacitor, the second pixel electrode and another corresponding one of the common lines forms a second storage capacitor, the first storage capacitor is connected in parallel with the first LC capacitor, and the second storage capacitor is connected in parallel with the second LC capacitor.

17. The liquid crystal display panel as claimed in claim 16, wherein the channel width/length ratio of the first thin film transistor is in the range from 1.5~2.5 times larger than the channel width/length ratio of the second thin film transistor.

18. The liquid crystal display panel as claimed in claim 16, wherein the channel width/length ratio of the first thin film transistor is approximately 2 times larger than the channel width/length ratio of the second thin film transistor.

19. The liquid crystal display panel as claimed in claim 1, further comprising a plurality of common lines, wherein the common lines and the gate lines extend along a first direction while respectively alternately arranged with each other along the second direction perpendicular to said first direction.

20. The liquid crystal display panel as claimed in claim 19, wherein the data lines extend along said second direction.

* * * * *